Figure 1:
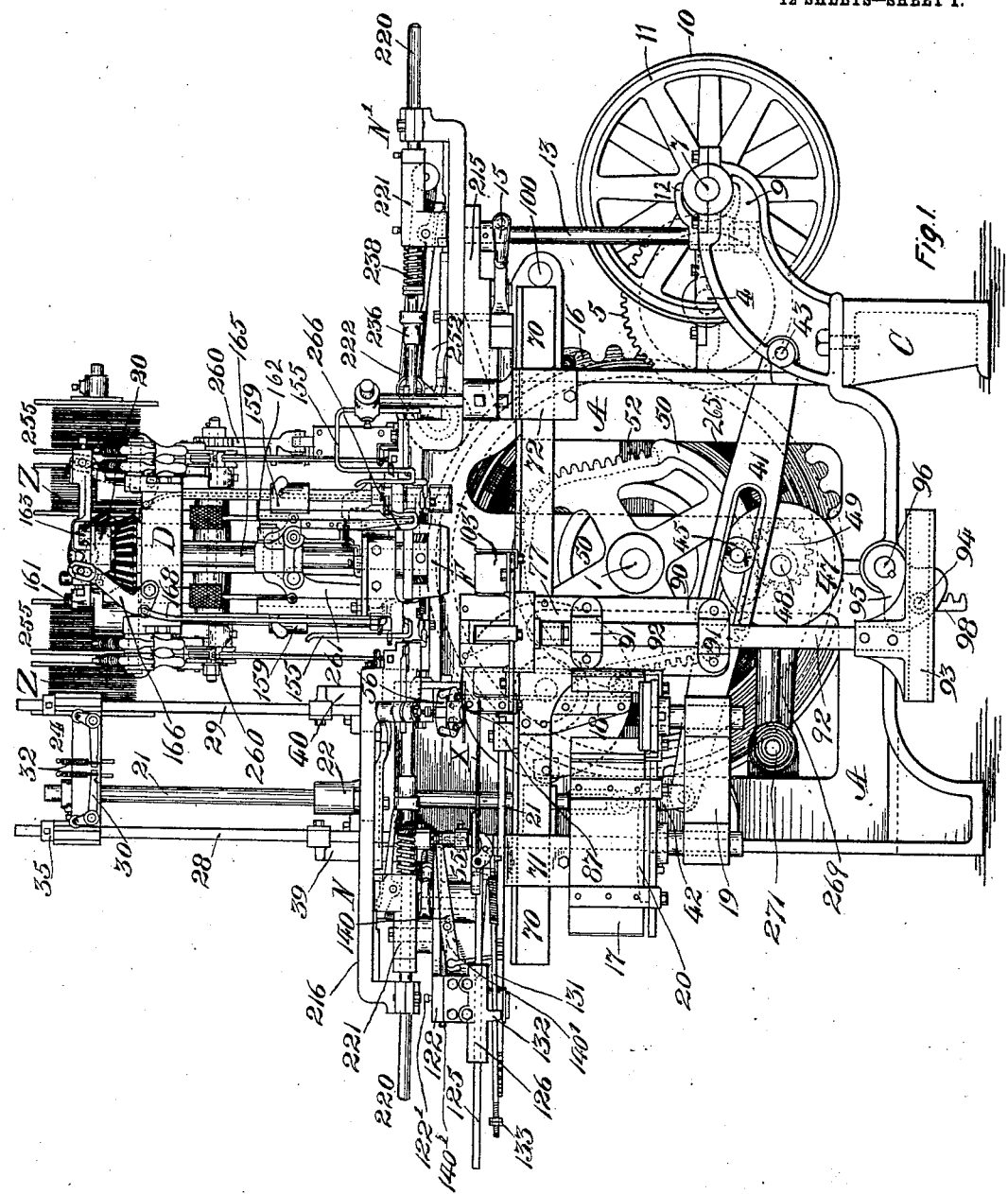

No. 835,135. PATENTED NOV. 6, 1906.
E. HORTON.
BASKET MAKING MACHINE.
APPLICATION FILED AUG. 15, 1905.

12 SHEETS—SHEET 1.

WITNESSES:
Paul J. Gathmann
E. B. Briner

INVENTOR:
Emmet Horton

BY HIS ATTORNEYS.
Baldwin & Wight

No. 835,135. PATENTED NOV. 6, 1906.
E. HORTON.
BASKET MAKING MACHINE.
APPLICATION FILED AUG. 15, 1905.

12 SHEETS—SHEET 2.

WITNESSES:
Paul J. Gathmann
E. B. Burns

INVENTOR:
Emmet Horton
BY HIS ATTORNEYS,
Baldwin & Wight

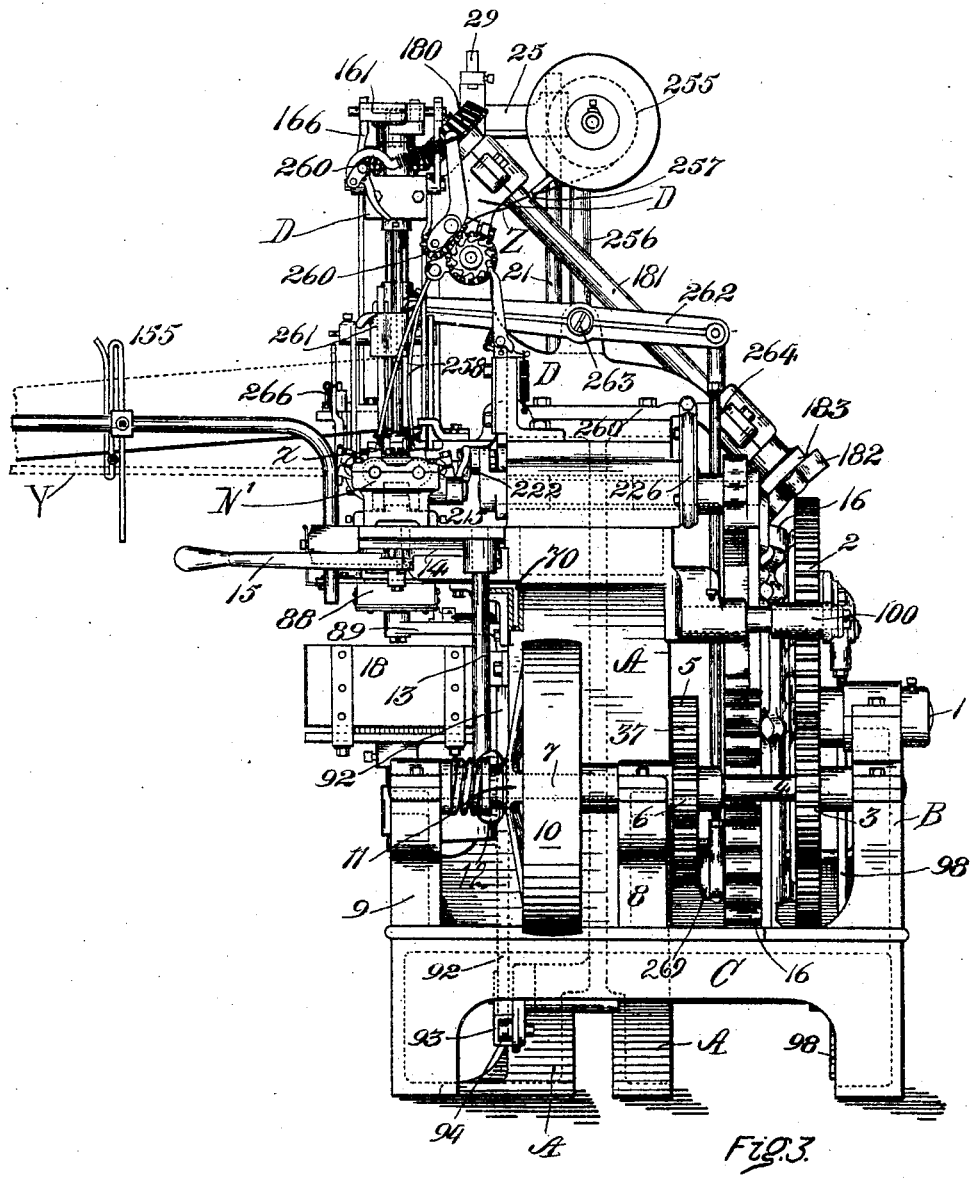

No. 835,135. PATENTED NOV. 6, 1906.
E. HORTON.
BASKET MAKING MACHINE.
APPLICATION FILED AUG. 15, 1905.
12 SHEETS—SHEET 4.
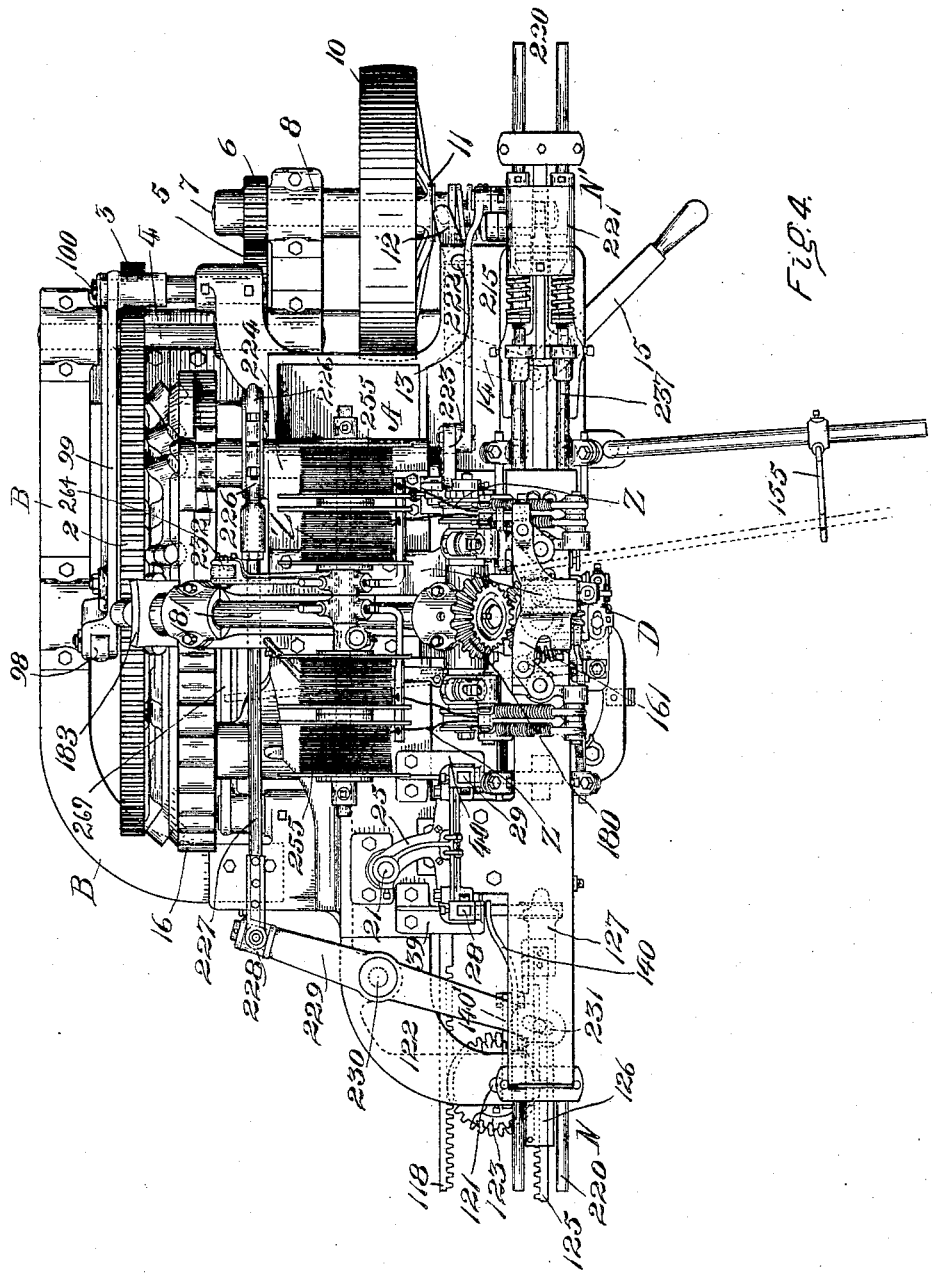
WITNESSES:
Paul J. Gathmann
E. B. Brown
INVENTOR
Emmet Horton
BY HIS ATTORNEYS
Baldwin & Wight

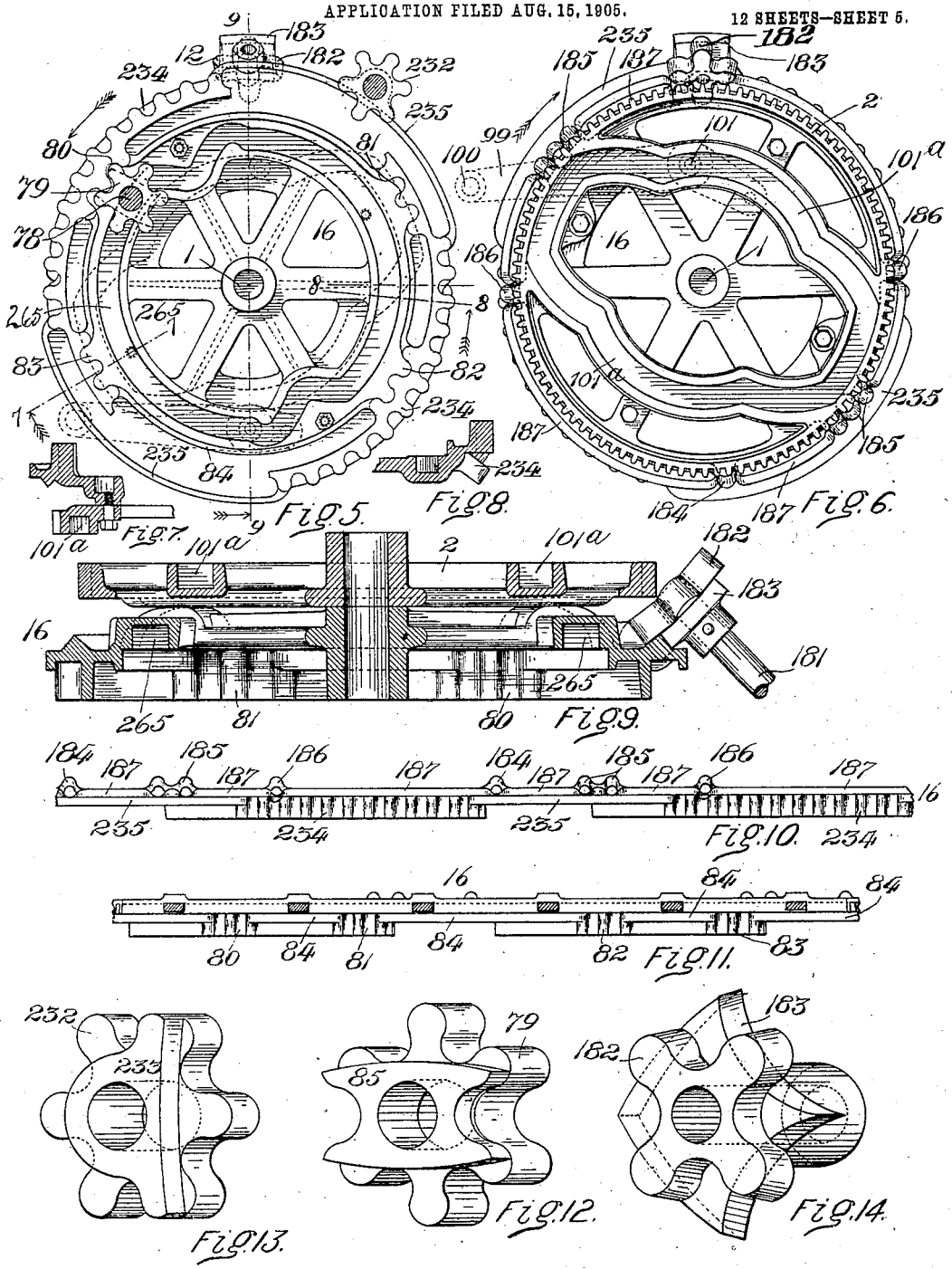

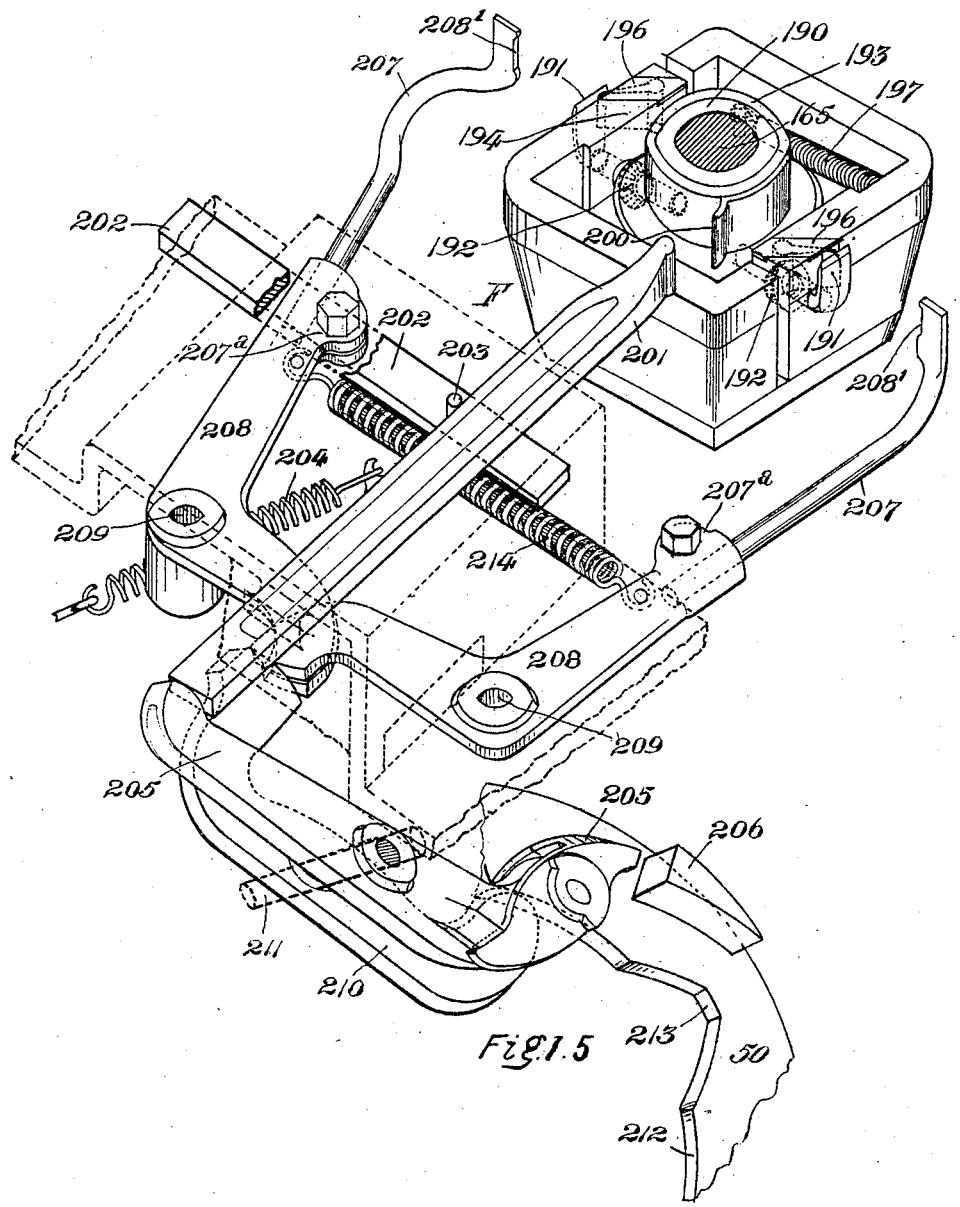

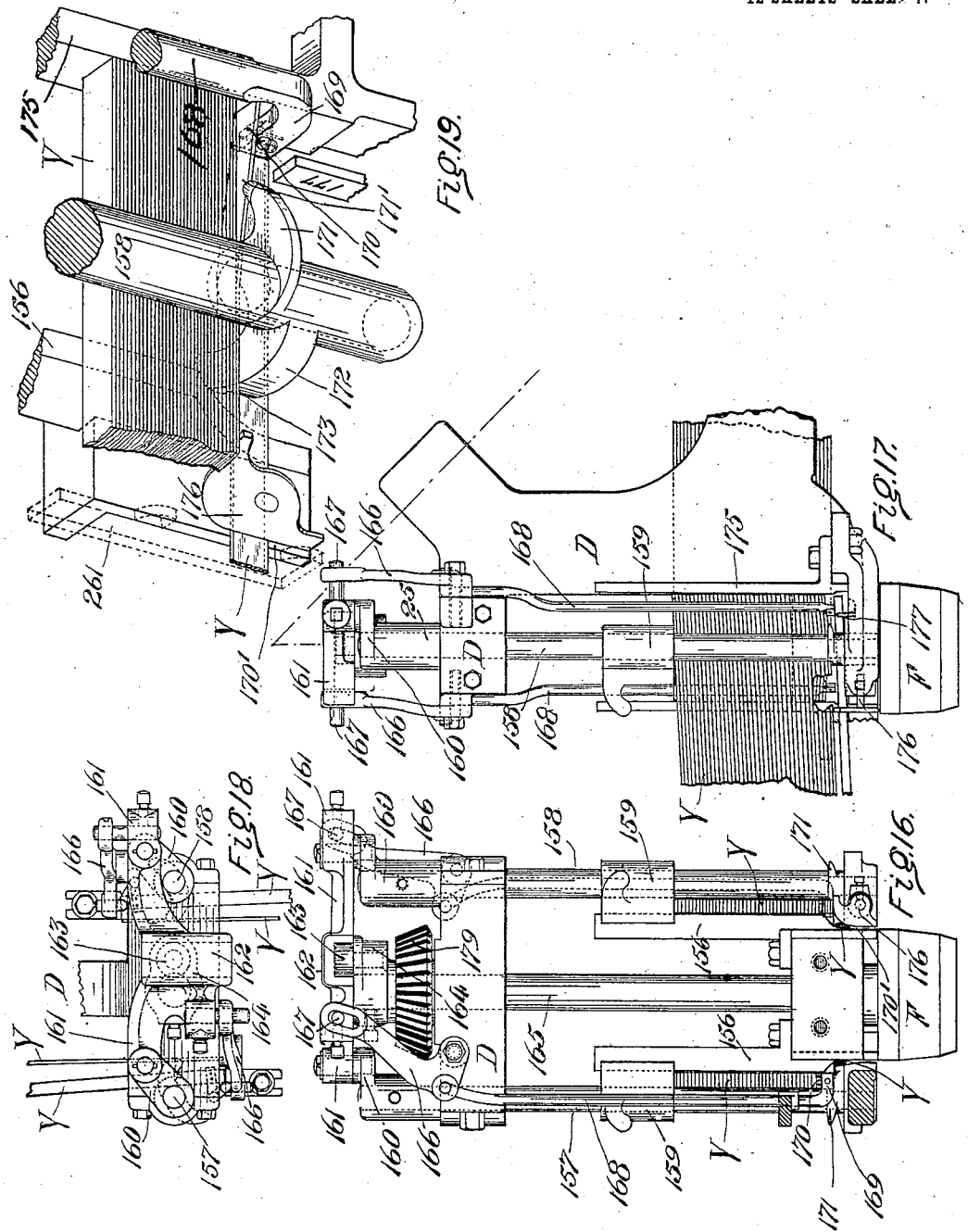

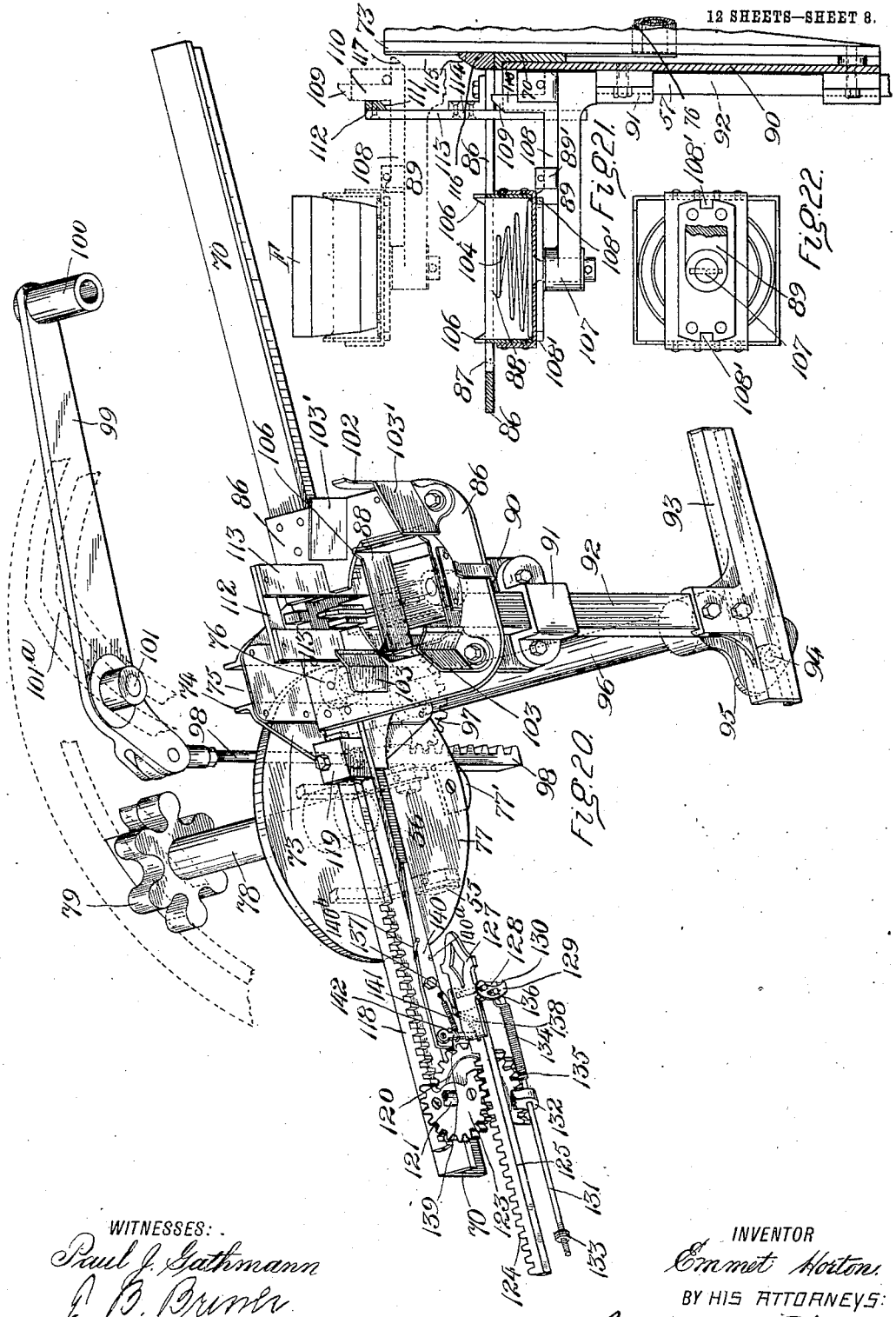

No. 835,135. PATENTED NOV. 6, 1906.
E. HORTON.
BASKET MAKING MACHINE.
APPLICATION FILED AUG. 15, 1905.
12 SHEETS—SHEET 9.
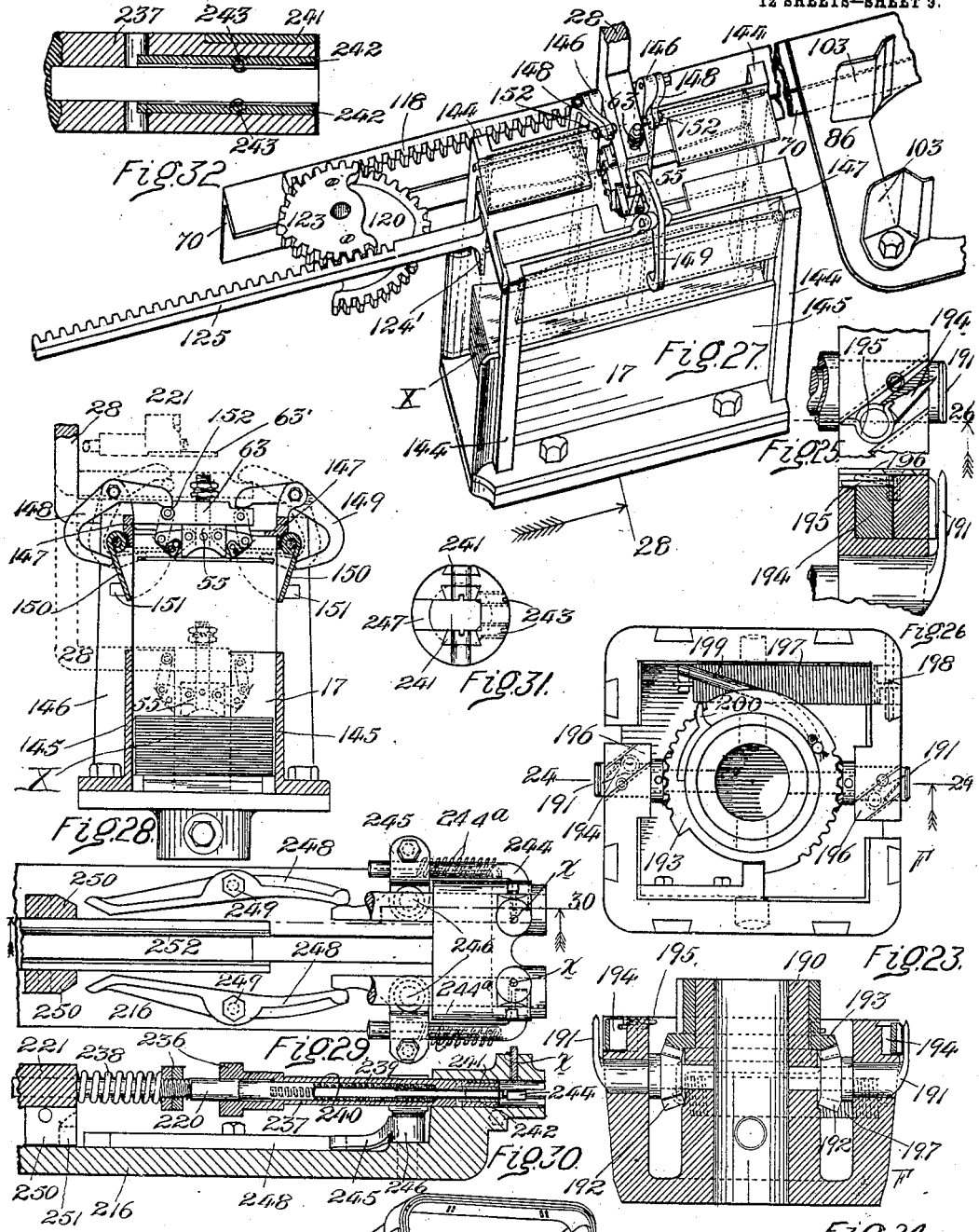
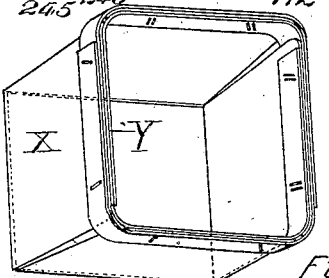
WITNESSES:
Paul J. Gathmann
C. B. Burr
INVENTOR
Emmet Horton
BY HIS ATTORNEYS
Baldwin Wight No. 835,135. PATENTED NOV. 6, 1906.
E. HORTON.
BASKET MAKING MACHINE.
APPLICATION FILED AUG. 15, 1905.
12 SHEETS—SHEET 10.
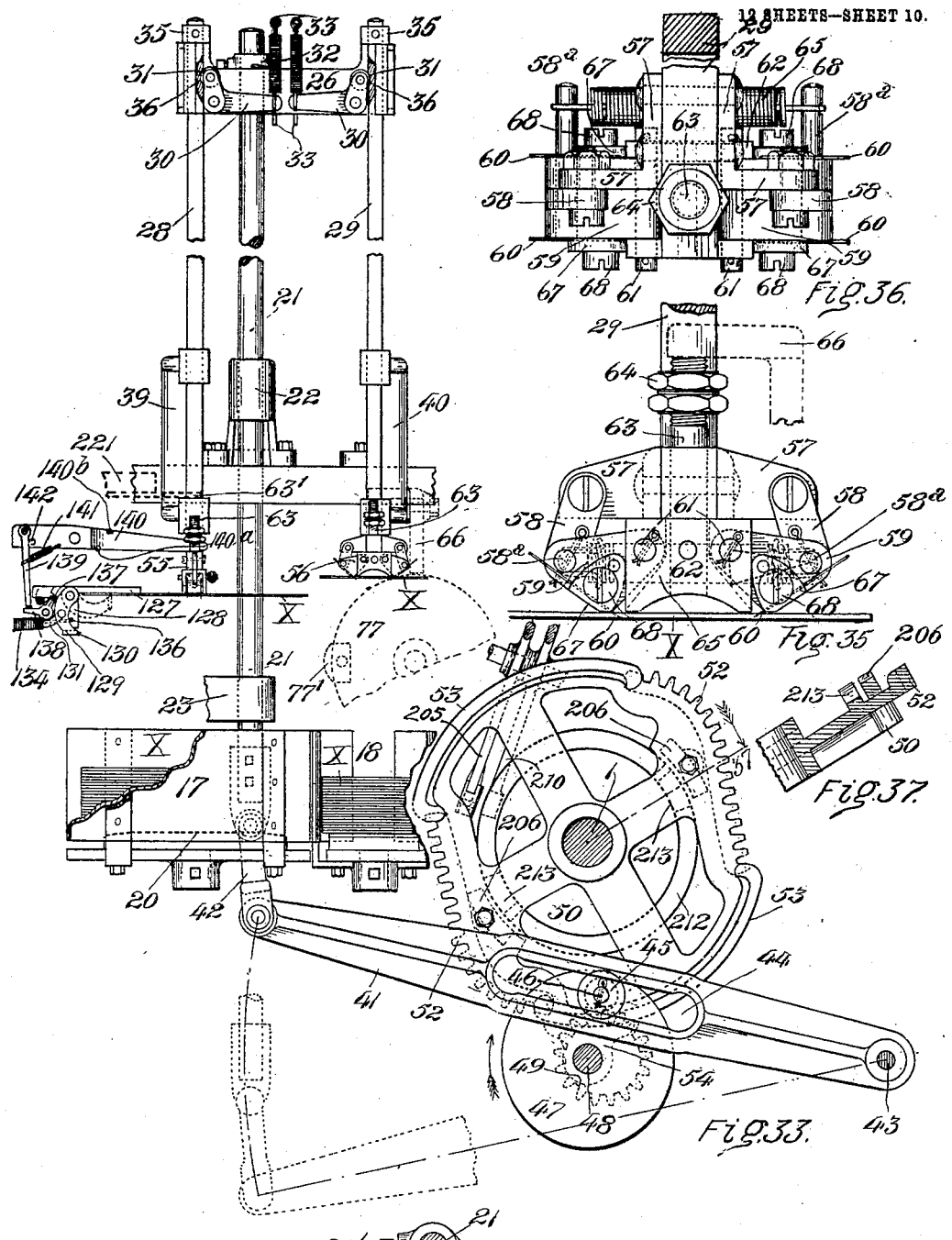
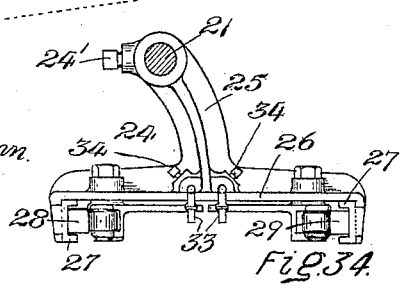
WITNESSES:
Paul J. Gathmann
C. B. Dunbr.
INVENTOR
Emmet Horton
BY HIS ATTORNEYS
Baldwin & Wight No. 835,135. PATENTED NOV. 6, 1906.
E. HORTON.
BASKET MAKING MACHINE.
APPLICATION FILED AUG. 15, 1905.

12 SHEETS—SHEET 11.

WITNESSES:
Paul J. Gathmann
E. B. Druver

INVENTOR.
Emmet Horton.
BY HIS ATTORNEYS:
Baldwin Wight

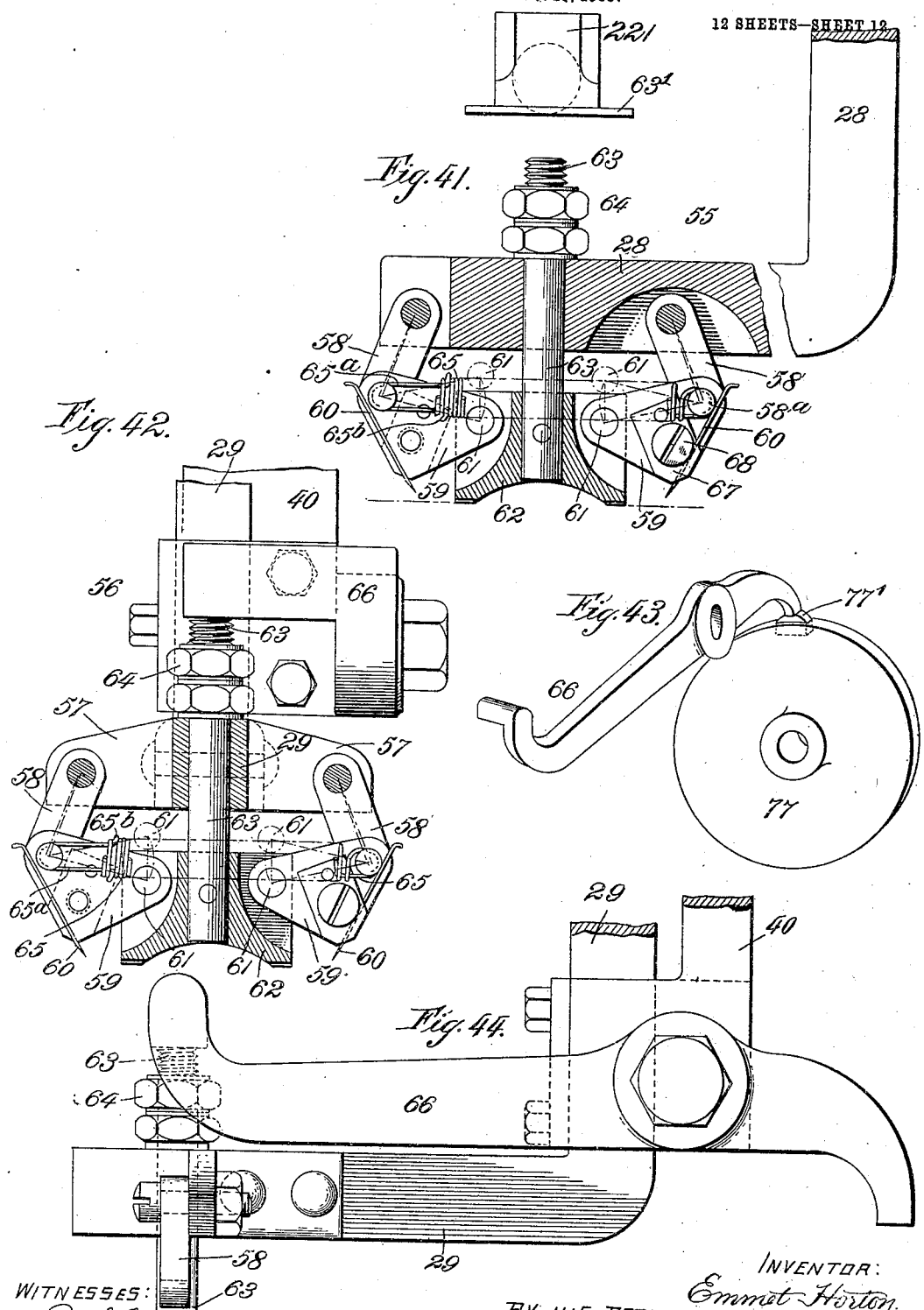

UNITED STATES PATENT OFFICE.

EMMET HORTON, OF ELMIRA, NEW YORK.

BASKET-MAKING MACHINE.

No. 835,135.  Specification of Letters Patent.  Patented Nov. 6, 1906.

Application filed August 15, 1905. Serial No. 274,301.

*To all whom it may concern:*

Be it known that I, EMMET HORTON, a citizen of the United States, residing at Elmira, in the county of Chemung and State of New York, have invented certain new and useful Improvements in Basket-Making Machines, of which the following is a specification.

This invention relates to machines for automatically making baskets of the kind in which the sides and bottom of the basket are formed from crossed pieces of wood veneer or other similar material which are bent into shape by forming mechanism and are held in their bent or shaped condition by bands or strips of wood or similar material secured to the upper edges of the sides of the basket.

Machines of this general kind are shown in my patents of March 16, 1897, August 6, 1901, May 24, 1904, and July 26, 1904.

The machine of my present invention is designed to make "square" berry-baskets.

The machine shown in my patents of May 24, 1904, and July 26, 1904, were designed to make oblong baskets; but much of the mechanism of my improved machine is similar to that shown in said patents last mentioned.

The object of my invention is to simplify the construction of the machines of the class referred to and to increase their output.

While the machine of my present invention is automatic in its operation, I do not wish it understood that my invention is limited to a machine entirely automatic, as many parts of the mechanism may be advantageously used in machines operated partly by hand. In this specification, however, I will describe an automatic machine and will sum up in the claims what I believe to be the novel features of my invention separately considered, as well as in organized mechanisms for performing operations incident to the manufacture of baskets of various kinds.

In the operation of the machine which I have constructed to embody my invention in the way now best known to me the body-blanks for the basket are arranged in two piles in receptacles at one side of the machine. A blank is lifted from each pile and deposited on a die, one blank being placed crosswise of the other, and when thus crossed the blanks are carried by the die into position under a form of the general shape of the interior of the basket. Two bands for each basket are fed to the form and by a partial rotation of the form are wrapped around it, after which the die is raised, causing the body-blanks which it carries to be bent around the form and to inclose those portions of the bands wrapped around the form. The form is then further rotated in such manner as to cause the bands to be wrapped around the outside of the body-blanks at their upper edges, and then these bands are secured to each other and to the body-blanks by staples made of wire just before they are driven. A further part revolution is then given to the form (thus completing a full revolution) and the ends of the bands are secured to the basket. After the blanks have been bent around the form by the die and the bands have been attached the die is lowered and carried away to one side to receive a new set of body-blanks. As soon as the bands are nailed to the body-blanks the basket is completed and is ejected.

The operations above described are merely the general operations of the mechanism. These operations are similar to those of the machine shown in my patent of May 24, 1904; but the construction of some of the mechanism in my improved machine has been changed, and the operation of some of the new mechanism has been materially altered. Thus in the new machine the blanks for the body of the basket are delivered by the pickers to a carrier which reciprocates instead of being oscillated from a position beneath the pickers to a position beneath the form, and the body-blanks are delivered from the pickers to the carrier in a novel way. The carrier has been considerably modified, and new and simpler mechanism has been employed for operating it. The band-feeding mechanism has been materially changed. Instead of relying on rotating screws to separate the bands from the piles I now employ pickers which draw the bottom bands from the piles and separators which coöperate with the pickers to move the bottom bands in the paths of ejectors which push the bands into the throats or channels from which they are drawn while being wrapped around the form. New and improved devices are employed for holding the bands while being wrapped, and the nailing mechanism has been simplified and made more efficient.

The mechanism is so constructed that two baskets are made and delivered during each revolution of the main shaft, so that I am now able to complete and deliver more than thirty baskets per minute.

In the accompanying drawings I have shown a fully-organized machine embodying my improvements.

The details of construction are fully illustrated in so far as it is necessary to understand my present improvements. In other respects the details are the same as those fully illustrated in my patents of May 24, 1904, and July 26, 1904.

Figure 2:
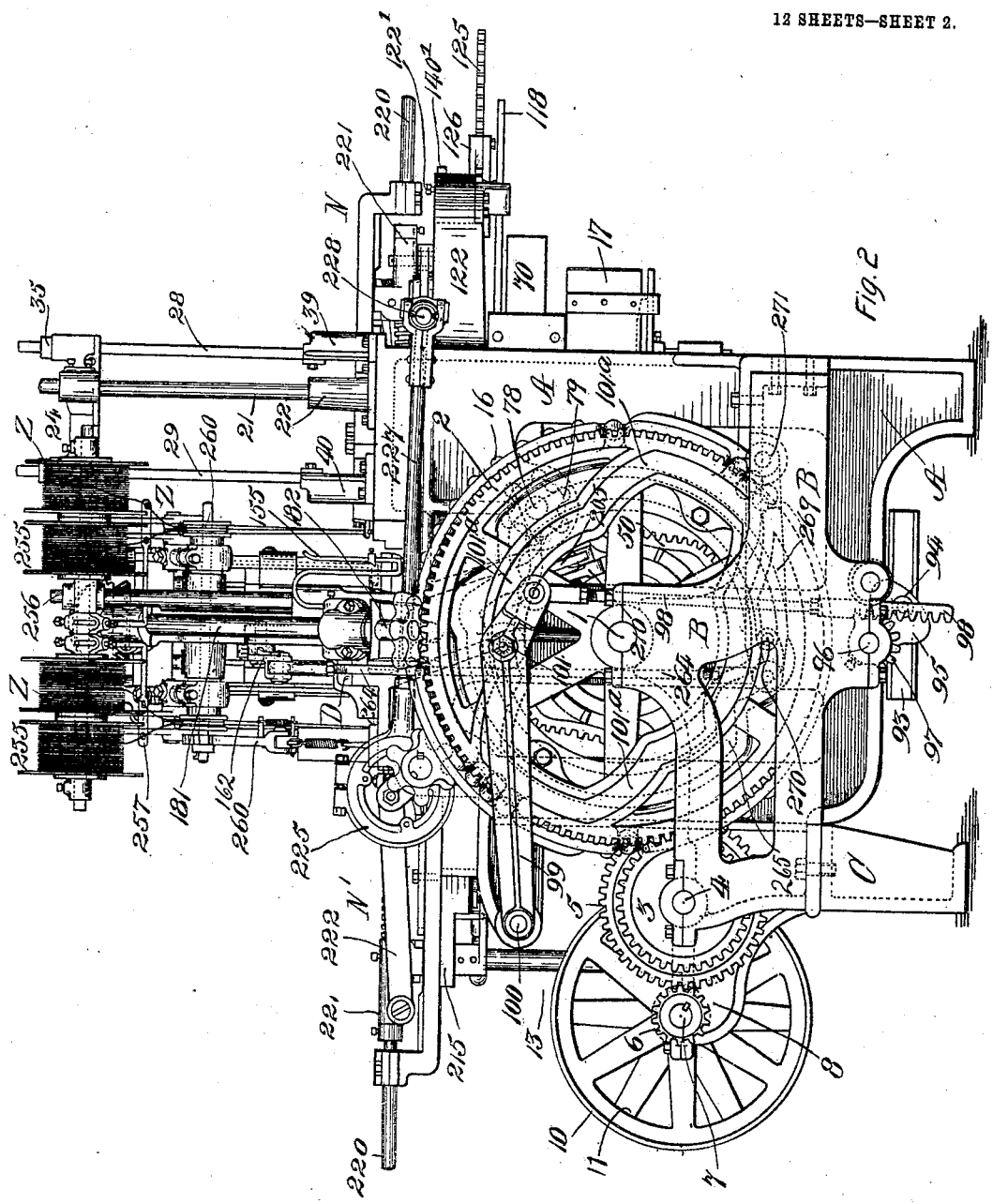
Figure 39:
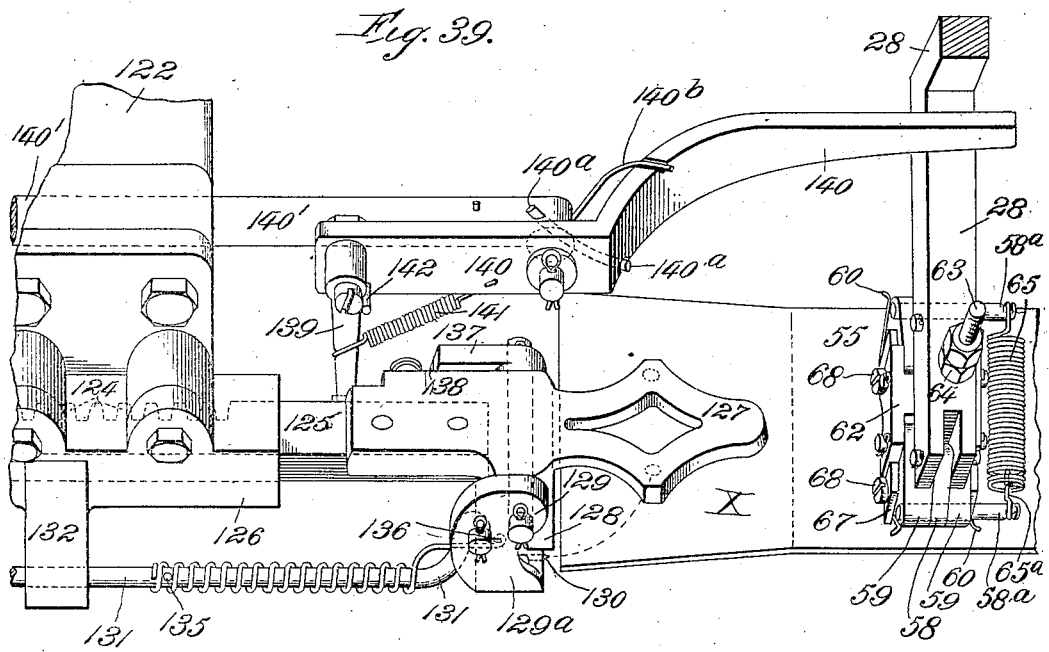
Figure 40:
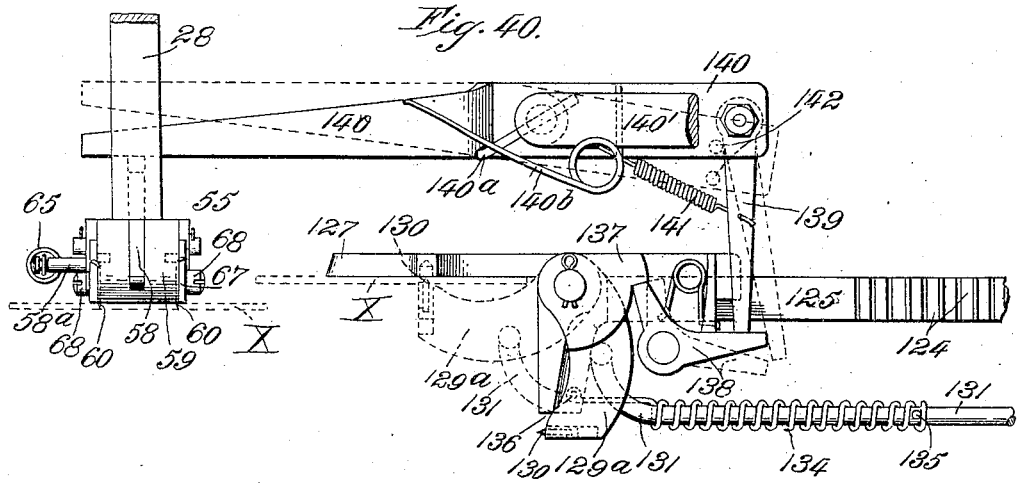

Figure 1 shows a front elevation of the machine. Fig. 2 shows a rear elevation thereof. Fig. 3 shows a right-hand end elevation. Fig. 4 is a top plan view. Fig. 5 shows a front elevation of the main cam and gear-wheel and the large spur-wheel for actuating the principal parts of the basket-forming mechanism. Fig. 6 shows a rear elevation of the same. Fig. 7 shows a section looking in the direction indicated by the arrow on the line 7 7 of Fig. 5. Fig. 8 shows a section on the line 8 8 of Fig. 5. Fig. 9 shows a section of the wheels on the line 9 9 of Fig. 5, the form-driving pinion being shown in elevation. Fig. 10 shows the periphery of the cam and gear-wheel developed. Fig. 11 shows the development of the interior of the rim of this wheel. Fig. 12 is a perspective view of the pinion which actuates the carrier. Fig. 13 is a similar view of the pinion forming part of the nailer-driving mechanism. Fig. 14 is a perspective view of the pinion forming part of the mechanism for revolving the form. Fig. 15 is a diagrammatic perspective view showing, on an enlarged scale, the form and the mechanism for operating the form-hooks and the band-wrapping arms. Fig. 16 is a front elevation of part of the machine, showing particularly the band-feeding mechanism. Fig. 17 shows a side elevation of the same. Fig. 18 shows a top plan view thereof. Fig. 19 is a perspective view, on a larger scale, of parts of the band-feeding mechanism. Fig. 20 is a perspective view, on an enlarged scale, illustrating the carrier for the body-blanks and parts associated therewith. Fig. 21 is a detail view of the same, showing particularly the construction and operation of the locking mechanism. Fig. 22 shows a bottom plan view of the die. Fig. 23 is a top plan view of the form. Fig. 24 shows a vertical section thereof on the line 24 24 of Fig. 23. Figs. 25 and 26 are detail views showing particularly one of the band-gripping dogs and parts associated therewith. Fig. 27 shows a modified way of constructing the boxes for the body-blanks and the mechanism for delivering the blanks from the boxes to the carrier. Fig. 28 shows a section of the same on the line 28 of Fig. 27. Fig. 29 is a plan view of part of the nailing mechanism. Fig. 30 shows a vertical section of the same on the line 30 of Fig. 29. Fig. 31 is an end view of part of the nailer mechanism. Fig. 32 shows a vertical section of the same. Fig. 33 is a view, on an enlarged scale, of the pickers for the body-blanks and the mechanism for operating them. Fig. 34 is a plan view of the top cross-head of the pickers. Fig. 35 is a detail view, on an enlarged scale, of one of the picker-heads. Fig. 36 is a plan view of the same. Fig. 37 shows a section of the gear-wheel shown in Fig. 33 on the line 37, and Fig. 38 is a perspective view of a basket made in the machine. Fig. 39 is a detail view, on an enlarged scale and in perspective, showing particularly the construction of the mechanism for lifting one of the body-blanks of the basket and the mechanism for taking the blank therefrom, gripping it, and carrying it to the carrier which conveys the crossed blanks to the form. It is a view looking downward from the front side of the machine. Fig. 40 is a view in side elevation of most of the mechanism shown in Fig. 39, but looking from the rear side. Fig. 41 shows, in section and on an enlarged scale, one of the blank-lifting pickers and the arm on the nailer-head which operates the needle-carrying levers. Fig. 42 shows in vertical section and on an enlarged scale the other picker and in front elevation the lever which operates the needle-carrying levers. Fig. 43 is a detail view in perspective of the oscillating lever for operating the needle-carrying levers shown in Fig. 42. It also shows the cam-disk for actuating the oscillating lever. Fig. 44 is a view, on an enlarged scale, of said oscillating lever, showing how it is pivotally mounted and how it operates upon the needle-carrying levers.

The main frame of the machine may be of any construction suitable to support the mechanism. In general the frame consists of a central or front portion A, a rear portion B, and a side portion C. These parts are bolted together in the manner indicated and are provided with suitable boxes or bearings for various parts of the mechanism and with brackets or shelves for supporting other parts. A frame-piece D, bolted to the top of the frame A, carries boxes or bearings for the vertical form-shaft and the vertical shafts of the band-feeding mechanism.

The main actuating-shaft 1 is arranged horizontally, and it is mounted in suitable bearings in the central rib of the frame portion A, and in the rear portion B the shaft 1 carries a large spur-wheel 2, which meshes with a pinion 3 on a shaft 4, carrying a spur-wheel 5, meshing with a pinion 6 on the driving-shaft 7, mounted in the arms or brackets 8 and 9 of the main frame and carrying a belt-pulley 10, which is connected with the shaft by means of a clutch-wheel 11, operated by a lever 12, attached to a vertical shaft 13, which is connected, by means of a link 14, with an operating lever or handle 15. This mechanism is similar to that shown in my patent of August 6, 1901, and need not be further described. The shaft 1 also carries a large cam and gear wheel 16, which is bolted to the spur-wheel 2. The wheel 16 is formed with cams and teeth for imparting proper movements at the proper times to the mechanism for operating the form, the carrier, the nailers, and other parts of the mechanism.

The body-blanks X, from which the bottoms and sides of the baskets are formed, are piled in boxes 17 and 18, having their longer axes arranged at right angles to each other at the left of the front of the machine, being supported on a bracket 19, attached to the frame-piece A. The boxes are similar to those heretofore employed by me and have bottoms 20, beveled at their ends to cause their middle portions to stand up highest directly under the picker-heads.

The pickers which lift the body-blanks from the boxes and deposit them on the carrier which conveys the blanks to the form are similar in general construction and operation to those shown in my patents of May and July, 1904, above referred to; but some changes have been made in the details of construction which render the pickers more certain and reliable.

The picker-operating rod 21, Fig. 33, reciprocates vertically in guides 22 23 of the main frame and has adjustably secured to its upper ends by a set-screw 24' a cross-head 24, comprising a horizontal arm 25 and a vertically-arranged plate 26. Each end of the plate 26 is bent forward and formed with recesses to receive brass plates 27, which provide friction-surfaces for the picker-bars 28 and 29. Pivoted to the cross-head are bell-crank levers 30, the shorter arms of which carry rollers 31, which bear against the picker-bars, and the longer arms of which are connected to springs 32, suspended from L-shaped rods 33, adjustably supported on the cross-head and held in place by set-screws 34. Collars 35, adjustably secured to the upper ends of the picker-bars, serve to confine the cross-head on the bars and insure that the bars shall be raised uniformly to the same height, according to their adjustment. The picker-bars are notched at 36 to receive the rollers 31 when the latter are in their extreme upper position on the bars. The picker-bars extend down through guide-boxes 39 and 40, secured to the top of the frame and overhanging it. These are similar to those heretofore employed by me and need not be described in detail. The rod 21 is reciprocated by means of a lever 41, connected to the rod by a link 42, pivoted at 43 to the frame and having a slot 44 to receive a roller 45 on a stud 46, projecting eccentrically from a disk 47, revolving on a fixed stud 48, to which disk is also secured eccentrically a differential pinion 49, which is actuated by a large mutilated gear-wheel 50, secured to the front end of the shaft 1. The wheel 50 is formed with alternate gears 52 and curved track-faces 53, the latter coöperating with a shoe 54 to hold the lever steady at the proper time, while the teeth 52 operate to rotate or turn the pinion 49, and thereby to turn the disk with its roller, and thus move the rod vertically at the proper time to the desired extent and at the required speed.

The general operation is similar to that described in my patents of May 24 and July 26, 1904, and is sufficiently indicated without further detail description.

The lower ends of the picker-bars 28 and 29 are bent at right angles and extended forwardly to support the picker-heads 55 and 56 directly over the boxes containing the body-blanks. The head 56 comprises two right-angled castings 57, rigidly bolted to the picker-bar and to which are pivoted links 58, in turn pivoted at their lower ends to levers 59, carrying diagonally-arranged needles 60 and pivoted at 61 to the presser-block 62, attached to the short rod 63, which extends vertically through the picker-bar and is free to move vertically therein, such movement being regulated by check-nuts 64 on the upper end of the rod. As shown, the levers 59 are relatively wide and heavy and are recessed or bifurcated to receive the lower ends of the links 58. The presser-block is I-shaped in horizontal section, being adapted to receive the needle-levers, and the needles are held on the levers 59 by plates or caps 67, held in place by screws 68.

A horizontally-arranged spring 65 has its ends attached to the rearwardly-projecting ends of the pivots 58$^a$ and serves to hold the needles steady and firmly in either their inserted or withdrawn position. When the presser-head is moved to either its upper or lower limit, the pivots 61 of the levers 59 are moved to a position either above or below the horizontal plane of the pivots 58$^a$, to which the ends of the springs are attached, as shown in Fig. 42, so that in either position of the presser-head the spring serves to hold the levers 59 firmly in either position. The spring also affords a resistance which it is necessary to overcome when the presser-head moves upward just after it has pressed the blanks prior to the insertion of the needles, and thus the accidental dropping of the blanks is prevented.

In Fig. 42 one end of the spring 65 is shown as secured permanently to one of the pivots 58$^a$. The opposite end of the spring may be adjustably secured to the other pivot. For this purpose a wire loop 65$^a$ may be connected with the pivot, and its hooked ends 65$^b$ may be attached to the proper coil of the spring to adjust the tension thereof. The tighter the spring the greater the pressure required to start the movement of the presser-head in either direction.

The picker-head 55 is similar in construction to the head 56 except that the right-angled castings are omitted and the links are pivoted directly to the picker-bar.

The wheel 50 has two series of teeth to operate the pickers for two baskets. As the wheel turns the rod 21 is moved vertically. At first while the rollers are in the notches 36 the picker-bars are moved positively downward and the presser-blocks are moved down upon the piles of blanks. Then the bars continue to move and the castings 57 move downward relatively to the needle-carrying levers 59, and these levers are turned on their pivots 61 so as to cause the needles to be inserted in the top blanks of the piles. After this the rollers 31 leave the notches 36, and the cross-head 24 continues to move downwardly without moving the picker-bars. When the cross-head reaches the limit of its downward movement and reverses and moves upward and as soon as the cross-head strikes the collars 35 and the rollers enter the notches, the picker-bars move upward with the picker-heads. As soon as the rod 63 is moved downward by the lever 66 relatively to the picker-bar 29, as shown in Fig. 42, the presser-block is moved downward and the needles are withdrawn. The rod 63 on presser-head 55 is operated by arm 63′ on the nailer cross-head in the manner hereinafter described.

The shape of the teeth 52 and the pinion 49 and the connection of the lever 41 therewith are such as to cause the pickers to descend rapidly and then at first to rise slowly and then move more rapidly.

The pickers serve to elevate the body-blanks at the proper time from the boxes and to hold them over a blank-carrier which conveys the blanks to the form.

The carrier is quite different from that heretofore employed, and the means for crossing the blanks have been considerably changed. The improved carrier is illustrated particularly in Figs. 20 to 22. It is supported on a horizontally-arranged angle-bar 70, mounted to reciprocate in guides 71 72, attached to the main frame. This bar has secured to its rear face a vertical plate 73, to which are attached flanged plates 74, between which is a space 75, that receives a roller 76, carried by a crank wheel or disk 77, secured to a shaft 78, which carries on its rear end a pinion 79, meshing with four sets of teeth 80 81 82 83 on the cam and gear-wheel 16. Fig. 11 shows the arrangement of these teeth. The shape of the pinion is shown in Fig. 12, and the manner in which it gears with the teeth is shown in Fig. 5. The pinion has six teeth, while there are three teeth on each set 80 81 82 83, so that the pinion is driven one-half of a revolution at each operation. It will be understood that two actuations are effected during the construction of a basket and that two baskets are made during the complete revolution of the cam and gear-wheel. One actuation causes the carrier to be moved toward the form, while the next causes it to be withdrawn therefrom. The segments 84 provide for the required pauses and a shoe 85 insures the steadying of the mechanism.

The die-plate 86 is rigidly secured to the bar 70 and projects horizontally forward therefrom. It has a central opening 87 to receive the die-cup 88 and the arm 89, which carries the die-cup. A vertical plate 90, secured to and suspended from the carrier-bar, supports guides 91, in which moves vertically a bar 92, to the upper end of which the arm 89 is secured. This bar carries on its lower end a grooved cross-piece 93, with which engages a roller 94, carried by a crank 95 on the front end of a rock-shaft 96, which carries on its rear end a segmental pinion 97, meshing with a rack-bar 98, pivotally suspended from a lever 99, pivoted at 100 to the frame and carrying a roller 101, which travels in a grooved camway 101$^a$ in the driving-wheel 2. This cam is so shaped as to move the die up, then allow it to revolve, then move it down and allow it to rest, and then to repeat these movements. The die-plate is provided with the guides or blank centering-posts 103 103′, so shaped that the blank which is fed laterally to the die is guided and the die-post 102 limits the movement inward of the blank. The die-cup carries a spring 104, which exerts an upward pressure on the blanks when being compressed around the form. Normally all portions of the die-cup, except the four corners 106, are disposed below the top of the die-plate, and the cup is pivoted centrally at 107 to the arm 89, so that the cup may rotate with the form while the bands are being wrapped. The upwardly-projecting ends or corners 106 of the die are beveled in such manner as to guide the blanks into the exact position they should occupy in the die. These upwardly-projecting corners serve to accurately center the blanks as soon as they come in contact with the form. The die-cup has recesses 108′, with which engage a longitudinal bolt 108, which slides in a guide 89′ on the top of the arm 89. In Fig. 21 the die-cup is shown locked to the arm 89 so that it cannot rotate; but when the arm is raised by the bar 93 the inclined surface 109 on the vertical arm 110 of the bolt is caused to engage the inclined surface 111 on the cross-bar 112, and the bolt is withdrawn, so that the die-cup is free to revolve. The cross-bar 112 is attached to the top of the vertical plates 113, which are attached at 114 to the die-plate. These plates also constitute guides for the arm 89, as they extend both above and below the die-plate.

The die-cup is again locked to the arm as the arm descends by means of the inclined surface 115 on the block 116, secured in place above the die-plate and which strikes the inclined end 117 of the bolt.

In general the operation is as follows: After blanks for a basket have been crossed on the die-plate within the guide-posts of the die-cup the carrier-bar is moved to the right and the die is moved into position beneath the form. Then the die-cup is raised above the die-plate and is unlocked from the die-carrying arm in the manner indicated in Fig. 21 by dotted lines. At this time the form is inclosed by the die-cup, and the cup revolves with the form while the bands are being applied. After a basket has been completed the bar 70 is reciprocated toward the pickers and the carrier thereon is moved to a position beneath the picker nearest to the form. As it moves in this direction a blank lifted by the picker farthest from the form is deposited upon the carrier by the mechanism next to be described. A rack-bar 118 is adjustably secured to the carrier-bar at 119, Fig. 20, and this bar gears with a segmental gear 120, mounted to revolve on a shaft 121, secured in the front end of a bracket 122. To the segment 120 is also secured a segmental pinion 123, which gears with a series of teeth 124 on a gripper-bar 125, that slides in a guide 126 on the left-hand front end of the bracket 122. The gripper-bar carries on its inner end an upper gripper-jaw 127, from which depends a bracket 128, to which is pivoted the lower gripper-jaw 129, comprising two downwardly-extending arms 129$^a$ and a cross-piece 129$^b$, connecting the lower ends of the arms and which carries needles 130, adapted to engage the body-blanks. To the front arm of the lower jaw is connected a rod 131, that extends through a guide-bracket 132, depending from the guide 126 and which carries on its outer or left-hand end adjusting-nuts 133, which are adapted to strike the guide-lug 132, and thus limit the inward movement of the rod. A spring 134 is coiled around the inner end of the rod and is secured thereto at 135. It is also secured to the bracket 128 at 136. This spring normally tends to hold the lower jaw in its upper position. The flat arm of the lower jaw is formed at its upper end with a lug 137, with which engages a spring-pressed latch 138, one arm of which is engaged by a pawl 139, depending from a horizontal lever 140, pivoted to a bar 141, adjustable by means of a set-screw 122' in the arm 122 of the main frame. (See Fig. 1.) A spring 141 normally draws the pawl 139 against a stop-stud 142. When the pivoted latch 138 engages the shoulder 137, it holds the lower jaw in its lowermost position, (indicated by full lines in Fig. 33;) but when the latch 138 is withdrawn the spring 134 causes the lower jaw to be elevated and to engage a blank, as indicated by dotted lines in Fig. 33. The lever 140 has its outer end arranged in the path of the picker-bar 28, so that when the picker is raised with a blank the lever 140 is operated to lift the lower jaw and cause the grippers to engage a blank. After this as the carrier-bar 70 moves to the left the gripper-bar is moved to the right and the grippers carry the blank to a position over the carrier. At this time the nuts 133 come against the lug 132 and the jaws are opened, allowing the blank to be dropped onto the carrier. Immediately after this the cam 77' on the wheel 77 engages the lever 66, and the second blank is dropped on the die above the other blank, the corners 106 guiding it into place. When this is done, the carrier is moved back to the form.

In Figs. 39 to 42 some of the parts shown in Fig. 20 are illustrated on a larger scale. It will be understood that a blank X is lifted by the picker 55 above the plane of the gripping-jaws. In Fig. 39 the parts shown are in the position they assume just before the laterally-projecting arm of the picker-bar 28 engages the end of the lever 140. As soon as the lever 140 is thus moved by the picker-bar said lever will cause the pawl 139 to move the latch 138 to the position shown by dotted lines in Fig. 40 and thus release it from the shoulder 137, allowing the spring 134 to contract and pull the rod 135 to the right, as viewed in Figs. 20 and 39, thus swinging the lower jaw, as shown by dotted lines in Fig. 40. Thus the jaws are closed upon the blank just at the time that the blank is lifted to the level of the under side of the fixed jaw 127. After the blank is gripped the presser-head continues to move a little farther upward, and the blank is pulled loose from the needles in the manner before described—viz., by reason of the rod 63 coming in contact with a projection or plate 63', Fig. 33, on the adjacent nailer-head. The presser-head remains up while the gripper runs forward, deposits the blank on the carrier, and returns, and as it returns the end of the latch 138, which is then in the position shown by full lines in Fig. 40, will strike against the pendent pawl 139 and push it to the position shown by dotter lines in Fig. 40 against the action of the spring 141, which spring again pulls the pawl into its normal position, (shown by full lines in Fig. 40,) when the picker-bar again drops and allows the lever 140 to resume its horizontal position. (Shown by full lines in Fig. 40.) The downward movement of the lever may be arrested by a suitable stop 140$^a$, and the lever may be assisted in its downward movement by a spring 140$^b$. When the lever 140 has assumed its normal position, the pawl 139 swings in over the latch 138.

As a substitute for the gripper mechanism shown in Fig. 20 I may employ the mechanism shown in Figs. 27 and 28, a pusher being substituted for the gripper. The box 17 for one pile of the body-blanks is provided with four vertical corner-posts 144, two side pieces 145, and two posts 146, arranged a distance apart to provide a guide for the picker-bar which moves vertically therein. The posts are connected by top rails 147. To each of the posts 146 is pivoted a bent lever 148 and another bent lever 149 is pivoted to the opposite side of the box. To the upper portion of each side is pivoted a plate 150, which normally hangs down and rests against a stop 151. The lower ends of the levers 148 149 bear against the plates 150, while their upper ends extend inwardly over the box and are adapted to engage the outer end of the picker and studs 152, projecting laterally therefrom.

In operation the picker descends into the box while the plates are down. When the picker rises, it engages the levers 148 and 149 and causes them to raise the plates into a horizontal position beneath the blank. As soon as the blank is released from the picker the pusher 124' is operated to push the blank from its position between the picker and plates to its position on the carrier.

The bands Y are, as heretofore, held in frames 155. Their inner ends are held between the vertical plates 156 and the vertical band-feeding shafts 157 158. Weights 159 are employed to hold down the bands, as in my prior machines. The shafts 157 158 carry at their upper ends cranks 160, which are pivotally connected with a cross-head 161, formed with a groove 162, which receives a roller 163 on a crank 164, projecting from the upper end of the form-shaft 165. As the form-shaft is revolved an oscillating movement is given to the band-feeding shafts. To the top portion of the frame-piece D are pivoted levers 166, which at their upper ends have a slot-and-pin connection 167 with the cross-head. To this lever are pivotally connected rods 168, which extend to the lower ends of the shafts 157 158 and have feet 169, armed with needles 170, which are adapted to engage the lowermost bands in the piles. Each shaft 157 158 is provided with a separator 171, having a flattened, sharpened, or pointed end 171' and an ejector 172, having a sharp or pointed end and a shoulder 173. In operation, as the form-shaft rotates and the cross-head is operated the pickers are lifted and engage the lowermost bands. Then they are lowered and cause the inner ends of the bands to be separated from the piles, as shown in Fig. 19. Immediately after this the separators 171 enter between the lower bands in the piles, and the ejectors 172 are completely withdrawn. Then the shafts turn back, the separators are withdrawn, and the ejectors enter, their shouldered ends engaging the ends of the bands, and as the ejectors move inward the bands are carried toward the throats or channels 170' and are delivered thereto and guided into place beneath the band-plungers 261, which are of the same construction and operate in the same way as in my prior machines. In other respects the band-feeding mechanism is similar to that before employed. I would say, however, that 175 indicates the plates against which the inner ends of the bands bear, 176 the curved guide-plates at the outer ends of the throats or channels, while 177 indicates a device for pushing the bands from off the needles.

The form-shaft 165 carries a pinion 179, which engages a pinion 180 on a shaft 181, carrying a pinion 182, provided with four teeth and engaging teeth on the cam and gear-wheel 16. The pinion has a steadying-shoe 183 and is operated by teeth 184 185 186, between which are plane faces 187, engaged by the shoe.

The form F (shown in Figs. 23-26) has a hub 190, rigidly secured to the lower end of the form-shaft, and it is provided with band-gripping hooks 191, similar to those heretofore employed. These hooks carry pinions 192, meshing with a segmental beveled pinion 193 on the form-hub. The dogs 194 are similar to those shown in my patent of July 26, 1904, and perform the same function; but in the improved machine the dogs are held in place by springs 195, encircling their inner ends, and plates 196, sliding in dovetailed grooves, are employed to hold the dogs in place, while permitting them to turn. These plates exclude dirt.

A spring 197, attached to the form at 198, is secured to a rod 199, attached to the pinion 193. This spring holds the pinion in the position shown in Fig. 23. The pinion also carries a lug 200, which is engaged at times by a plunger 201. In all other respects the form is the same in construction as that shown in my patent last mentioned. At times the pinion 193 is actuated to turn the band-hooks to either receive the bands or permit the finished basket to be stripped from the form by the band-plungers. The pinion is actuated by a plunger 201, which is guided by the main frame and by a bar 202, carrying a stud 203, against which the plunger is drawn by a spring 204. The plunger is actuated by a lever 205, operated by lugs 206 on the cam and gear-wheel 50, the arrangement being such that during the construction of each basket one of the lugs comes in contact with the lever and causes the plunger to be pushed forward, thus turning the pinion 193 and turning down the hooks 191, so as to permit the basket to be ejected.

The bands are held by the band-supporting hooks 266, as heretofore; but in order to hold the bands more securely while the last ends thereof are being nailed I employ the band-holding arms 207, which are held by levers 208, pivoted at 209 to the main frame, and are engaged by a lever 210, that swings on the shaft 211 and one end of which engages the cam-track 212 in the wheel 50. When the end of the lever rides on the raised portion of the track, the bands are held away from the form. This is during the time the bands are being fed to the form, new body-blanks fed, or the basket being removed; but when the bands are nearly wrapped around the sides the end of the lever enters the recess 213 in the wheel 50, and the outer end of each band is held close and truly to the form while it is being nailed. The levers 208 are drawn toward each other by the spring 214. The band-holding arms are adjustable by means of the clamping devices 207$^a$. If desired, the arms may be arranged to hold the bands during the whole time that the bands are being wrapped around the body-blanks and nailed thereto. The ends of the arms are recessed at 208' to receive the bands and hold them in proper alinement.

The nailers are similar to those heretofore employed; but some changes have been made in details of construction. The two nailers N N' are located on opposite sides of the form, the nailer N' on the right-hand side being supported on a shelf 215, projecting from the main frame. The nailer N on the left has its frame above the nailers. Fig. 30 shows a section on the line 30 of the nailers on the right-hand side of the machine looking from the rear and in the direction of the arrow in Fig. 29. The nailing hammer-rods 220 are attached to a cross-head 221, which is reciprocated in the following manner: To the rear side of the cross-head at the right is joined a pitman 222, jointed to the crank-arm 223 on the end of the shaft 224, on the rear end of which is a cam 225, carrying a ring 226, connected with a rod 227, adjustably secured to the ring and coupled at 228 to the lever 229. On the rear end of the shaft 224 is a pinion 232, provided with a shoe 233, engaging, respectively, the teeth 234 and the rails 235 on the periphery of the wheel 16. By this mechanism the nailers are properly operated at the proper times, one set of teeth 234 operating the nailers during the construction of one basket and the other set during the formation of the other one.

The hammer-rods 220 carry adjustable nuts 236 and extend through staple-forming sleeves 237. Springs 238 are interposed between the cross-head 221 and the nuts 236, and springs 239 are interposed between the front ends of the sleeves and shoulders 240 on the hammer-rods. In the front of the sleeves are the cutters 241 and the steel wearing-plates 242, fitted in dovetailed grooves and held in place by screws 243. These plates assist in forming the staples.

The anvils or benders 244 are carried by bell-crank levers 245, pivoted at 246 to the base or frame of the nailers. Springs 244$^a$, attached to the bell-crank levers and to the nailer-frame, move the anvils in one direction—that is, in a direction to insert the anvils across the wires. The anvils project into grooves 247 in the sleeves and the bell-crank levers are engaged by tripping-levers 248, pivoted at 249 to the frame, and they are engaged at times by lugs 250, projecting from the cross-head 221 and having inclined surfaces 251. The lugs are guided by a bar or rail 252.

As the cross-head is reciprocated the hammer-rods and sleeves move forward together until the sleeves bear against the basket. Then the hammers move farther forward and drive the staples. As the cross-head moves forward and after the staples are formed the lugs 250 engage the trip-levers 248 and cause the anvils to be withdrawn.

The wire Z, from which the staples are formed, is carried on spools 255, supported on a frame 256, and the wire passes from the spools through guides 257 and guide-tubes 258 to the nailer, where it enters at $x$. The mechanism 260 for feeding the wire is the same as that heretofore employed and will not be described in detail. Mechanism of substantially the same construction is shown in my Patent No. 760,791, of May 24, 1904.

I have not described the band-plungers and the mechanism for operating them; but in the drawings the band-plungers are indicated at 261, and they are operated by a lever 262, pivoted at 263 to the frame part D and connected at its rear end to a rod 264, jointed at its lower end to a lever 269, pivoted at 271 to the main frame and carrying a roller 270, traversing a cam-groove 265 on the wheel 16.

The band-holding hooks 266 are the same as before used. Briefly stated, the operation of the machine is as follows: The pickers descend upon the piles of blanks, the needles carried by the pickers engaging the top blanks of the piles, and then the pickers are raised, each carrying a single blank. The blank carried by the picker farthest from the form is engaged by the gripping mechanism and is fed to the right toward the form and toward the carrier, which is at this time moving away from the form. As the carrier moves farther away from the form the blank carried by the first picker is dropped on the carrier. Immediately after this the cam 77' on the wheel 77 operates the lever 66, and the blank carried by the picker nearest the form is deposited on the carrier crosswise of the blank first deposited thereon. Then the die-carrier moves to a position beneath the form and the die-cup rises with the blanks and the blanks are bent around the form. Prior to this, however, bands have been supplied to the form and the form has been given a one-fourth revolution, which wraps the bands about the form, and when the die-cup rises the blanks come in contact with the form and are recentered by the action of the corners 106. They are then bent around the form and around the bands carried thereby. Then the form is given one-half of a revolution, which wraps the bands around the outside of the body-blanks. Then the nailers operate to secure the bands together and to the body-blanks. A further one-fourth revolution is then given to the form, and the ends of the bands are turned in against the basket and the nailers operate again to secure these ends to the basket. While the ends of the bands are being secured to the basket the arms 207 hold the bands against it. When this is done, the hooks 191 are reversed and the basket is stripped from the form.

It will be understood that two baskets are produced by the machine during a single revolution of the main cam and gear wheels, and the mechanism is so organized as to properly feed the blanks and supply the staples at the proper times to cause the machine to manufacture two baskets during each revolution, as above specified.

It will be observed that the mechanism for conveying the blanks to the form is quite different from that heretofore employed and possesses many new and valuable features, resulting in a larger output for the machine. The mechanism for separating the bands from the piles and delivering them to their guiding throats or channels is materially different from that heretofore used, and the changes in the details of the construction of the nailers much simplifies them and insures their accurate operation, inasmuch as the nailer cross-head cannot come forward without swinging the levers 248 and throwing outwardly the anvils or benders from their position in front of the hammers, and as the hammers cannot advance ahead of the movement of the cross-head they may come close to but cannot by any strain on the mechanism come in contact with the anvils. I do not herein claim the nailing mechanism shown and described, as such subject-matter is claimed in my application for Patent No. 303,285, filed February 27, 1906.

I claim as my invention—

1. In a basket-making machine, the combination with a revoluble form, of a die movable toward and from the form in line with the axis thereof, and also laterally relatively thereto in a straight path.

2. In a basket-making machine, the combination with a revoluble form, of a die movable toward and from the form vertically and also laterally relatively thereto in a straight path and which is adapted at times to rotate with the form.

3. In a basket-making machine, the combination with a revoluble form, of a reciprocating bar, a revoluble die carried thereby, a rock-shaft, connections between the rock-shaft and the die by which it is moved toward and from the form, and means for reciprocating the carrier-bar to move the die laterally toward and from the form.

4. In a basket-making machine, the combination with a form, of a die-cup having raised vertical corners for centering the blanks as the form enters the die, and means for raising and lowering the cup.

5. In a basket-making machine, the combination with a form, of a die-cup having its corners raised and beveled to a point for centering the blanks as the form enters the die.

6. In a basket-making machine, the combination of a form, a die-plate having means for centering the body-blanks, and a die movable toward and from the form and having independent means for centering the blanks.

7. In a basket-making machine, the combination with a form, of a die-plate having centering-posts, and a die-cup having raised projections at its corners for centering the blanks.

8. The combination of the die-cup, the supporting-arm to which it is pivoted, means for raising and lowering said supporting-arm, a locking-bolt carried by the arm and adapted to engage the die, a beveled cross-bar engaging the bolt when the die is raised and which causes the bolt to be withdrawn from the die and a beveled block engaging the bolt when the die is lowered and which causes the bolt to engage the die.

9. In a basket-making machine the combination with a form, of a blank-carrier, means for reciprocating it to and from the form, and means for crossing blanks thereon while it is moving away from the form.

10. In a basket-making machine the combination with a form of a blank-carrier, a rotatable die carried thereby, means for moving the blank-carrier to and from the form and means for crossing blanks on the blank-carrier, while it is moving away from the form.

11. In a basket-making machine, the combination with a form, of two blank-carriers one of which places a blank crosswise of the blank on the other carrier which latter delivers to the form, and which are operated to reciprocate in opposite directions, the one moving toward the form, while the other moves away from it, substantially as described.

12. In a basket-making machine, the combination with a form, of a blank-carrier, means for moving it away from the form, another blank-carrier which deposits a blank on the carrier first mentioned while it is moving away from the form, means for supplying another blank to said first-mentioned carrier and means for moving said first-mentioned carrier with its two blanks toward the form.

13. In a basket-making machine, the combination with a form, of a blank-carrier, means for moving it from the form and means for crossing blanks thereon on its outward movement away from the form and before it commences its backward movement toward the form.

14. In a basket-making machine, the combination of a form, pickers for raising the blanks, a die-carrier, means for moving it toward and from the form, a blank-carrier, means for moving it toward the form while the die-carrier is moving away therefrom, devices for causing a blank to be deposited by said blank-carrier on the die-carrier, and devices for depositing another blank on said carrier, substantially as described.

15. In a basket-making machine, the combination of a form, two boxes for holding body-blanks having their longer axes arranged at right angles to each other, a carrier for conveying blanks from the boxes to the form, means for crossing the blanks by passing one blank under the other while it is suspended, and means for depositing the blanks crosswise on the carrier, substantially as set forth.

16. In a basket-making machine, the combination with a form, of a reciprocating blank-carrier for carrying the body-blanks of the basket to the form, a gripping device for conveying a body-blank, and means for operating the gripping device to deposit a blank on the carrier while said carrier is moving away from the form.

17. In a basket-making machine the combination with a form of a carrier for conveying the body-blanks, a rotatable die carried thereby, a gripping device for conveying a body-blank and means for operating the gripping device to deposit a blank on the carrier during its movement away from the form.

18. In a basket-making machine, the combination of a carrier-bar, a die-carrier attached thereto, a gripping device engaging a body-blank, gearing between this gripping device and the carrier-bar for causing the gripping device to move in the contrary direction to that of the carrier-bar and means for supplying blanks to the gripping device.

19. In a basket-making machine, the combination of a carrier-bar, a die-carrier attached thereto, a gripping device consisting of upper and lower jaws, gearing connecting the carrier-bar with the gripping device, and means for operating the lower jaw to cause it to engage a blank and to withdraw therefrom, substantially as described.

20. In a basket-making machine, the combination of a picker for raising a body-blank out of its receptacle, a device following up under the blank when it is raised by the picker to confine it for transportation, and means for operating said device.

21. In a basket-making machine, the combination with means for separating a blank from the top of a pile of blanks, of a plate adapted to follow under the separated blank as it departs from the pile, and means for operating said plate.

22. In a basket-making machine, the combination with a picker for separating and lifting blanks from a pile of blanks, gripper-jaws for engaging the blank raised by the picker, and tripping devices operated by the picker for causing the gripping-jaws to close on a separated blank and take it from the picker.

23. In a basket-making machine, the combination of a box for containing body-blanks, plates pivotally connected therewith at its upper end, levers for operating said plates, a picker for raising blanks above the plates and which operate the levers to turn the plates under the raised blank, and means for removing the raised blank from between the plates and the picker.

24. In a basket-making machine, a picker comprising pivoted needle-holding levers, a spring connecting the levers and means for moving the levers to cause the connections between the ends of the spring and said levers to pass beyond the pivotal centers of the levers whereby the spring acts to cause pressure to be exerted on the blanks before the needles can enter and to draw the needles inwardly into engagement with the blanks, substantially as described.

25. The combination of the needle-carrying levers, the pressure-block with which they are pivotally connected, the links connected with the needle-carrying levers, a spring connecting the pivotal connections of said links with the needle-carrying levers, and means for operating the parts whereby as the needle-carrying levers are swung on their pivots the spring is caused to either draw the needles inward toward each other or tends to draw them in an opposite direction, substantially as described.

26. In a basket-making machine, the combination of a vertically-moving picker-bar, a presser-head carried thereby, links and levers pivotally connected with the picker-bar and with the presser-head, a vertically-sliding rod carried by the presser-head, needles carried by the levers, a pivoted lever adapted to engage said vertically-sliding rod, and means for operating said lever to cause said rod to slide.

27. In a band-separating device for a basket-making machine, a rock-shaft having fixed blades swinging alternately under a pile of bands, one blade serving to separate from the pile the lowermost band and the other blade pushing the separated band from under the pile.

28. Band-separating devices for basket-making machines in which two blades move back and forth in opposite directions to separate and deliver the bottom band from a pile of bands, one of said blades moving outwardly while the other moves inwardly and one blade moving the band below the path of the other blade.

29. Blank-separating devices for basket-making machines, comprising a separating-blade and a picker which engages the under side of a blank and moves it below the path of the separating-blade.

30. Band-feeding devices for basket-making machines, comprising a picker which engages the under side of the lowermost band in a pile of bands, a blade which enters between the separated band and the others and means for delivering the separated band from beneath the pile.

31. In a basket-making machine, the combination of a picker engaging the under side of a band in a pile of bands and separating said band from the pile, a separator which enters between the pile of bands and the band separated by the picker and an ejector which delivers the separated band from beneath the pile.

32. Blank-separating devices for basket-making machines, comprising a separating-blade adapted to enter between the blanks in a pile and a picker arranged to engage a blank, move it in the plane of the pile and separate it from the pile previous to the entrance of the separating-blade.

33. Blank-separating devices for basket-making machines, comprising a separating-blade, a picker which engages a blank and moves it in the plane of the pile away from the pile, and means for actuating the separating-blade to cause it to enter between the separated blank and the pile and to further move said separated blank away from the pile.

34. Blank-separating devices for basket-making machines, comprising two reciprocating blades, one of which moves outwardly while the other moves inwardly and one of which blades causes the blank to move beyond the path of the other blade, substantially as described.

35. The combination with a revoluble form, of a band-holding arm normally held away from the form and out of engagement with the band being wrapped, and means for actuating said arm to move it toward the form and hold the outer end of the band close to the form at the time the last end of the band is being nailed.

36. In a basket-making machine, the combination of a revoluble form, band-holding arms normally held away from the form and out of engagement with the band being wrapped movable simultaneously toward opposite sides of the form and which engage the last ends of the bands and hold them close to the form at the time the ends of the bands are being nailed.

37. In a basket-making machine, the combination with a revoluble form, of devices for supporting the bands as they are being wrapped around the form and a supplemental band-wrapping arm normally held away from the form and out of engagement with the band being wrapped, which takes hold of and guides the band after it leaves the said band-supporting device, substantially as described.

38. In a basket-making machine, the combination with a form mounted to revolve about a vertical axis, band-wrapping arms projecting to each side of the form and pivoted to oscillate toward and from each other and toward the form, and means for operating the arms to hold the bands on the form while being nailed.

39. In a basket-making machine, the combination with a form having band-holding hooks on opposite sides, of pinions connected with the hooks, a beveled gear meshing with the pinions, a reciprocating plunger engaging the beveled gear, a lever for moving the plunger, and means for operating the lever.

40. In a basket-making machine, the combination of the pickers, the vertically-reciprocating picker-rod, the lever with which it is connected and which is formed with a longitudinal slot, a roller traversing said slot, a wheel on which it is eccentrically pivoted, a differential pinion connected with said wheel and a segmental gear for operating said pinion whereby the picker-bar is moved rapidly downward and more slowly upward.

41. In a basket-forming machine adapted to construct two baskets during each revolution of the main shaft, the combination of a rotatable form, a gear-driven pinion connected therewith having a shoe formed with four flat faces and four intermediate teeth and a gear provided with teeth engaging the pinion and imparting to the form two half and four quarter revolutions during the construction of two baskets.

In testimony whereof I have hereunto subscribed my name.

EMMET HORTON.

Witnesses:
  THOS. W. GOULD,
  H. F. KINGSBURY.